US008186368B2

(12) United States Patent
Troutman et al.

(10) Patent No.: US 8,186,368 B2
(45) Date of Patent: May 29, 2012

(54) CHILD CARETAKING STRUCTURES WITH ADJUSTABLE CANOPIES AND/OR HEADRESTS

(75) Inventors: Damon Troutman, Lake Forest, IL (US); Patrick Kelly, Romeoville, IL (US); Maureen Fitzgerald, Chicago, IL (US); Raphael Avila, Mundelein, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 223 days.

(21) Appl. No.: 12/405,010

(22) Filed: Mar. 16, 2009

(65) Prior Publication Data
US 2009/0235964 A1    Sep. 24, 2009

Related U.S. Application Data

(60) Provisional application No. 61/038,298, filed on Mar. 20, 2008.

(51) Int. Cl.
*A47C 7/62* (2006.01)

(52) U.S. Cl. ............ 135/88.02; 297/184.13; 297/184.17

(58) Field of Classification Search ............... 135/88.02; 280/642; 297/184.1, 184.11, 184.13, 184.15, 297/184.17, 220, 250.1, 256.1, 256.11, 391, 297/410
See application file for complete search history.

(56) References Cited

U.S. PATENT DOCUMENTS

| 1,165,518 | A |   | 12/1915 | Krell |
|---|---|---|---|---|
| 1,429,881 | A |   | 9/1922 | Howe |
| 3,248,125 | A |   | 4/1966 | Gill |
| 4,093,305 | A | * | 6/1978 | Staroste et al. .......... 297/184.17 |
| 4,725,076 | A |   | 2/1988 | Taylor |
| 4,871,141 | A | * | 10/1989 | Chen ............................. 248/534 |
| 4,880,331 | A |   | 11/1989 | Zun |
| 4,883,315 | A |   | 11/1989 | Ferguson |
| 5,020,709 | A |   | 6/1991 | Hoaglan |
| 5,211,696 | A | * | 5/1993 | Lacy ............................. 297/397 |
| 5,257,799 | A |   | 11/1993 | Con et al. |
| 5,277,213 | A |   | 1/1994 | Mitchell |
| 5,286,134 | A |   | 2/1994 | Huang |
| 5,388,853 | A |   | 2/1995 | Lauro |
| 5,454,584 | A |   | 10/1995 | Haut et al. |

(Continued)

FOREIGN PATENT DOCUMENTS

GB           2248426          4/1992

OTHER PUBLICATIONS

"PCT International Search Report," issued by the International Searching Authority on Jul. 16, 2009, in connection with International Application No. PCT/US2009/037846, 3 pages.

(Continued)

*Primary Examiner* — Noah Chandler Hawk
(74) *Attorney, Agent, or Firm* — Hanley, Flight & Zimmerman, LLC

(57) ABSTRACT

Child caretaking structures having adjustable canopies and/or headrests are described. An example child caretaking structure includes a frame having a track with a plurality of indentations and a canopy. The example canopy includes a canopy stay connector coupled to a canopy clip, wherein the canopy clip is slidably coupled to the frame. The example canopy clip includes a first end, a second end and at least one protrusion between the first end and the second end dimensioned to selectively engage a first of the indentations of the track to fix the canopy at a first height.

16 Claims, 15 Drawing Sheets

U.S. PATENT DOCUMENTS

| | | |
|---|---|---|
| 5,522,639 A | 6/1996 | Jaime |
| 5,542,732 A | 8/1996 | Pollman |
| 5,551,745 A | 9/1996 | Huang |
| 5,624,152 A | 4/1997 | Yoshie et al. |
| 5,687,985 A | 11/1997 | Sack |
| 5,758,889 A | 6/1998 | Ledakis |
| 5,765,856 A | 6/1998 | Kiser |
| 5,829,834 A | 11/1998 | Silverman |
| 5,845,666 A | 12/1998 | Messner |
| 5,887,935 A | 3/1999 | Sack |
| D412,468 S | 8/1999 | Berket et al. |
| 5,975,613 A | 11/1999 | Sippel |
| 5,988,669 A | 11/1999 | Freese et al. |
| 6,000,713 A | 12/1999 | Lin |
| 6,027,163 A | 2/2000 | Longenecker |
| 6,076,206 A * | 6/2000 | Celaya ............................. 5/414 |
| 6,170,910 B1 | 1/2001 | Bapst |
| 6,234,187 B1 * | 5/2001 | Izzo ............................... 135/98 |
| 6,443,522 B1 * | 9/2002 | Kain et al. ............. 297/184.17 |
| 6,464,294 B1 | 10/2002 | Kain |
| 6,814,368 B2 | 11/2004 | Cheng |
| 6,863,297 B2 | 3/2005 | Shapiro |
| D508,444 S | 8/2005 | Huang |
| 7,000,625 B2 | 2/2006 | Dickson et al. |
| 7,044,497 B2 | 5/2006 | Hartenstine et al. |
| 7,077,423 B2 | 7/2006 | Hutchinson |
| 7,188,858 B2 | 3/2007 | Hartenstine et al. |
| 7,234,722 B1 | 6/2007 | Madigan et al. |
| 7,234,771 B2 * | 6/2007 | Nakhla ....................... 297/250.1 |
| 7,249,779 B2 | 7/2007 | Ehrenreich et al. |
| 7,806,472 B2 * | 10/2010 | Runk et al. ............... 297/219.12 |
| 2002/0145318 A1 | 10/2002 | Abach et al. |
| 2006/0237932 A1 | 10/2006 | Moore, II |
| 2007/0246915 A1 | 10/2007 | Madigan et al. |
| 2007/0251557 A1 | 11/2007 | Carter et al. |
| 2009/0194973 A1 * | 8/2009 | Wang ............................ 280/642 |

OTHER PUBLICATIONS

"PCT Written Opinion," issued by the International Searching Authority on Jul. 16, 2009, in connection with International Application No. PCT/US2009/037846, 8 pages.

"International Preliminary Report on Patentability," issued by International Bureau in connection to International Application No. PCT/US2009/037846, on Sep. 30, 2010, 9 pages.

* cited by examiner

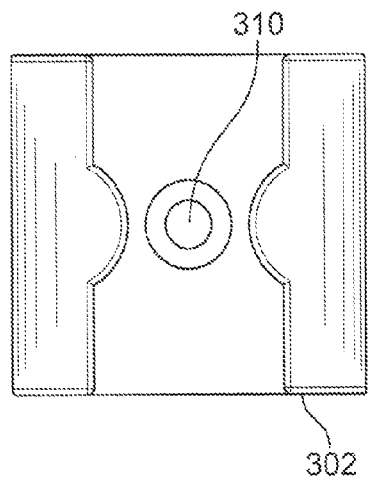
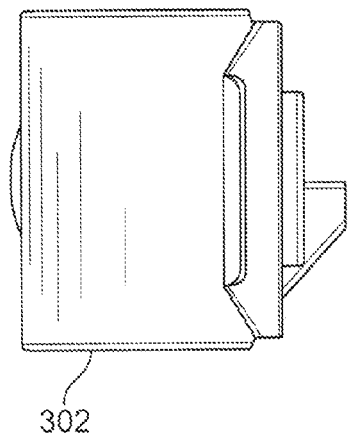
FIG. 6
FIG. 7
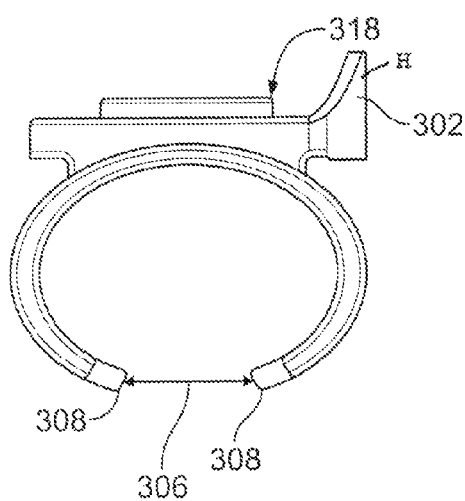
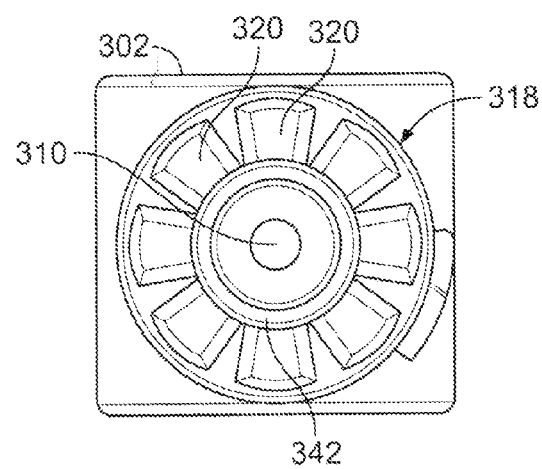
FIG. 8
FIG. 9

CHILD CARETAKING STRUCTURES WITH ADJUSTABLE CANOPIES AND/OR HEADRESTS

RELATED APPLICATION

This application claims the benefit of U.S. Provisional Patent Application Ser. No. 61/038,298, which was filed on Mar. 20, 2008, and is incorporated herein by reference in its entirety.

FIELD OF THE DISCLOSURE

This disclosure relates generally to child care products, and, more particularly, to child caretaking structures with adjustable canopies and/or headrests and methods of using the same.

BACKGROUND

Child caretaking structures include, for example, strollers, bassinets, high chairs, car seats and a number of other structures that are commonly used when caring for babies or small children. Many of these structures include canopies and headrests.

BRIEF DESCRIPTION OF THE DRAWINGS

FIG. 6 is a plan view of the inner surface of the example canopy clip of FIG. 4.

FIG. 7 is a side view of the example canopy clip of FIG. 4.

FIG. 8 is bottom view of the example canopy clip of FIG. 4.

FIG. 9 is a plan view of the outer surface of the example canopy clip of FIG. 4.

FIG. 15 is an assembled view of the combination of FIG. 14a.

DETAILED DESCRIPTION

Child caretaking structures having adjustable canopies and/or headrests are described herein. An example child caretaking structure includes a frame having a track with a plurality of indentations and a canopy. The example canopy includes a canopy connector coupled to a canopy clip, wherein the canopy clip is slidably coupled to the frame. The example canopy clip includes a first end, a second end and at least one protrusion, which extends between the first end and the second end. The protrusion engages a first of the indentations of the track to fix the canopy at a first height. In addition, the protrusion may engage a second of the indentations of the track to fix the canopy at a second height.

Some example child caretaking structures described herein include a seatback and a headrest adjustably coupled to the seatback. An example seat back includes a front face on which a plurality of first fasteners is mounted, and an example headrest includes a back face on which a plurality of second fasteners is mounted. At least one of the plurality of first fasteners engages at least one of the plurality of second fasteners at a first position to fix the headrest at a first height relative to the seat back. In addition, at least one of the plurality of first fasteners engages at least one of the plurality of second fasteners at a second position to fix the headrest at a second, different height relative to the seat back.

Figure 1:
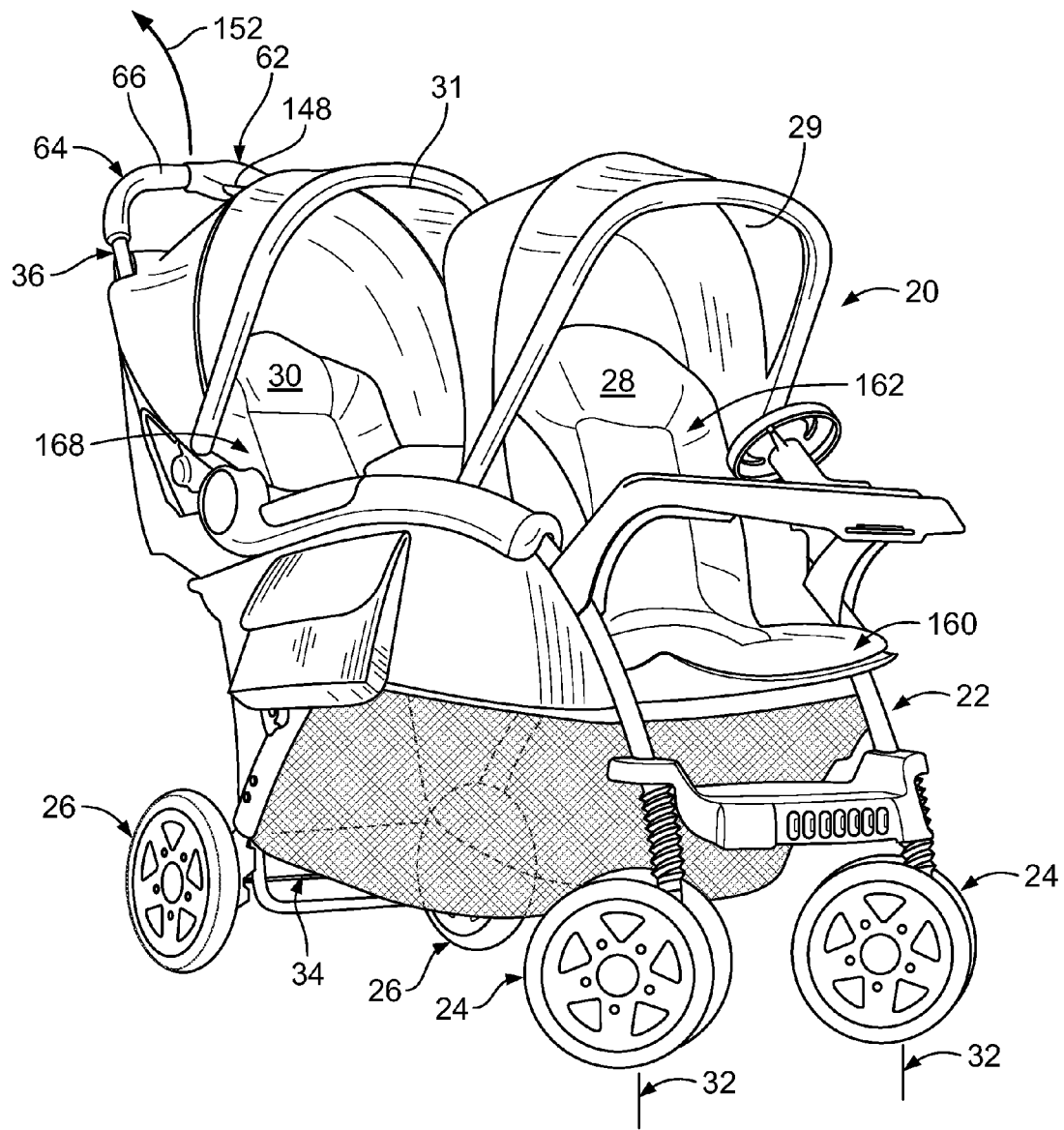
FIG. 1 is a perspective view of an example child caretaking structure.

An example child caretaking structure 20 is shown in FIG. 1. The illustrated example child caretaking structure is a tandem stroller 20 that includes a frame assembly (or frame) 22, first and second sets of wheels 24, 26, first and second seats 28, 30 and first and second canopies 29, 31. The first set of wheels 24 are separately pivotably mounted on the frame 22, such that the wheels may independently move about a pair of parallel, substantially vertical axes 32 relative to the frame 22. By contrast, the second set of wheels 26 are mounted to the frame 22 using a common axle 34, as shown, such that the wheels do not rotate about a vertical axis relative to the frame 22, but only a horizontal axis. The first seat 28 may be mounted to the frame 22 in line with the second seat 30. In this orientation, the first seat 28 is referred to as the front seat, and the second seat 30 may be referred to as the rear seat. While this naming convention regarding "front" (or "forward") and "rear" (or "backward") is used throughout, this is merely for purposes of convenience and illustration, and not by way of limitation.

Figure 2:
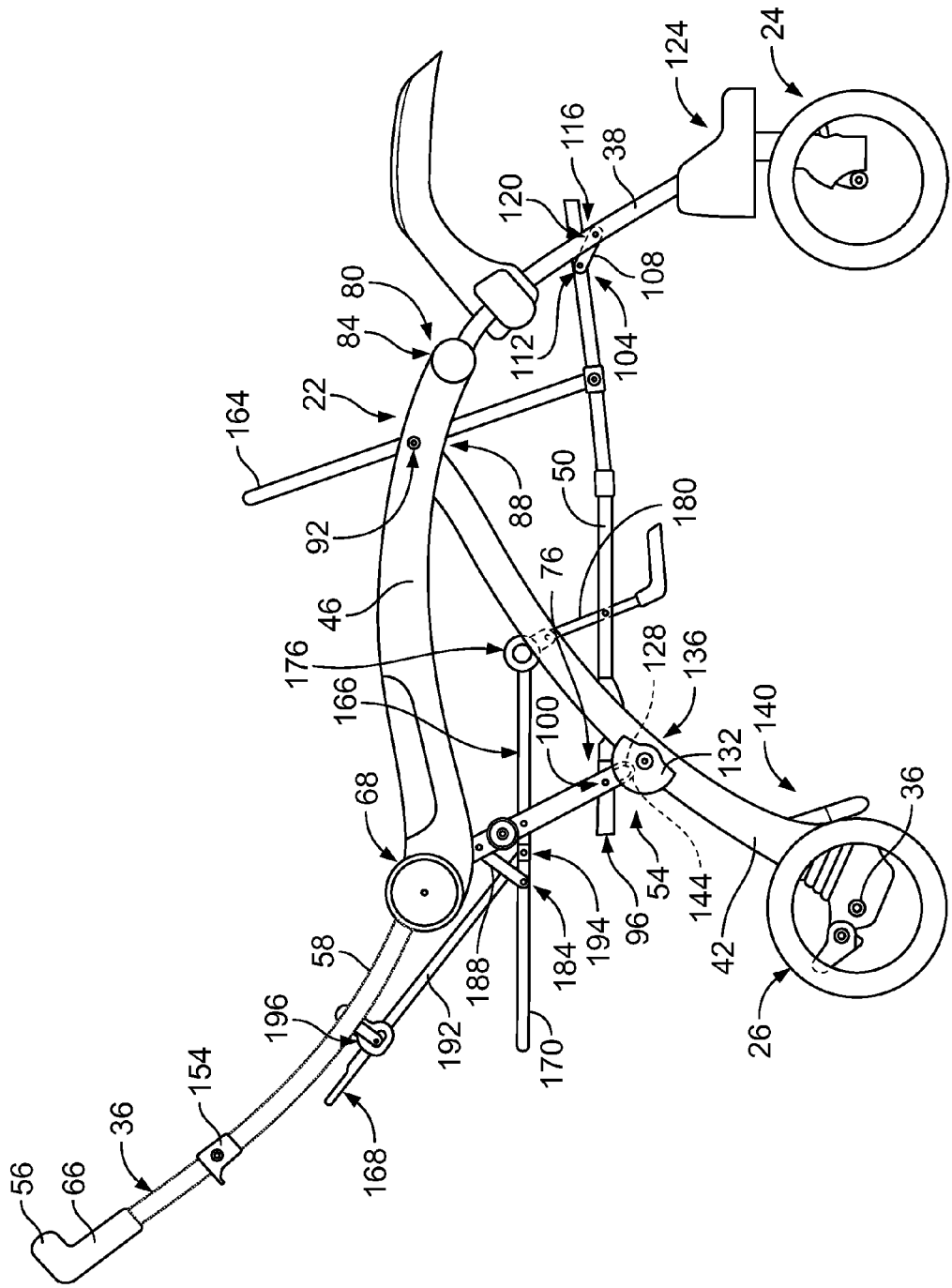
FIG. 2 is a side view of the child caretaking structure of FIG. 1 with the soft goods removed.

Referring now to FIG. 2, the frame assembly 22 of the illustrate example includes a number of members. In particular, the frame 22 includes a handle 36, front wheel support members 38, rear wheel support members 42, upper side members 46, and lower side members 50. The handle 36, front wheel support members 38, rear wheel support members 42, upper side members 46 and lower side members 50 are pivotally connected to each other to facilitate folding of the frame 22. The frame assembly 22 also includes a latch mechanism 54 that is used to limit the motion of the members relative to each other when the frame 22 is in the operational state shown in FIG. 1 to prevent collapsing, and to permit the relative motion of the members so that the frame assembly 22 may attain a collapsed state.

The arrangement and connection of the members of the frame assembly 22 shown in the figures is for illustrative purposes only. Other arrangements of members may be used, and the other arrangements may include additional members not shown in the figures, or may decrease the number of members shown. Thus, for example, although the illustrate stroller is an in-line tandem stroller, the stroller could have one seat or other seat arrangements (e.g., side-by-side seats). Further, the example frame 22 of FIG. 2 is roughly symmetrical and, thus, corresponding components from the left side may appear on the right side and vice versa even though duplicate components are not shown in these figures. In addition, while the frame assembly 22 is generally symmetrical about a central axis bisecting the stroller from front to back, such that the first side of the frame 22 shown in FIG. 2 is the mirror image of the second side of the frame 22, the frame need not be symmetrical. Also, the pivotal connections may be as they are shown in the figures and explained herein, or in other places if desired.

The handle 36 of the illustrate example formed from a single tube that is bent into a U-shape, having a bight 56 and legs 58. The handle 36 may be hollow, and may be used to mount some or all of the latch mechanism 54 and/or some or all of a fold mechanism 62, as shown in FIG. 1, that is used to change the state of the latch mechanism 54, as will be explained in greater detail below. Also, the bight 56 defines a gripping section 64, where the user takes hold of the handle 36 to move the stroller 22. A grip 66, made of a foam material, for example, is mounted to the gripping section 64. Alternatively, a member may be attached to the gripping section 64 and extend from the gripping section 64 at an angle to form a pistol-like grip. As a further alternative, the grip 66 may be omitted. The second canopy 31 is height-adjustably coupled to the handle 36 (e.g., via the handle leg 58) using the mechanism described herein.

The pivotal attachment of the members of the frame is now discussed with reference to FIG. 2, recognizing that the stroller 20 as shown is symmetrical about a longitudinal axis bisecting the stroller from front to back such that explanation of the connections for one side of the frame 22 applies with equal force to the other side of the frame 22. As shown in FIG. 2, the handle 36 is pivotably attached to the front wheel support member 38 and the rear wheel support member 42 via the upper side member 46. That is, the leg 58 of the handle 36 may be pivotably attached to an end 68 of the upper side member 46 between the bight 56 and a support strut 76. An end 80 of the front wheel support member 38 is pivotably attached to a forward end 84 of the upper side member 46. A forward end 88 of the rear wheel support member 42 is pivotably attached to the upper side member 46 at a location 92 intermediate between the ends 68, 84 of the upper side member 46.

The support strut 76 is pivotably attached to the front wheel support member 38 via the first lower side member 50. That is, a rearward end 96 of the lower side member 50 is pivotably attached at a location 100 to the support strut 76. A forward end 104 of the lower side member 50 is pivotably attached to a first end 112 of an intermediate link 108. A second end 116 of the link 108 is attached to the front wheel support member 38 at a location 120 between the end 80 and a lower end 124 of the front wheel support member 80.

As mentioned previously, the support strut 76 may mount some or all of the latch mechanism 54. The latch mechanism 54 of the illustrate example includes a pair of latch bars or pins (one of which is shown in FIG. 2 with reference number 128) and a pair of latch plates (again, one of which is shown in FIG. 2 with reference number 132).

The pin 128 is fitted into the support strut, and may move relative to the support strut between an extended (or locking) state as shown in FIG. 2 and a retracted (or unlocking) state. In the extended state, the pin 128 depends beyond the support strut 76 to engage the plate 132. In the retracted state, the pin 128 at least partially withdraws into the support strut 76 such that the pin 128 disengages the plate 132. The pin 128 is biased toward the extended state through the use of a spring (not shown) or the like.

The plate 132 is fixedly secured to the rear wheel support members 42 at a location 136 between the forward end 88 and a rearward end 140 of the rear wheel support member 42. The plate 132 has a recess 144 formed therein to receive the pin 128 when the pin 128 is in the extended state. While the recess 144 of FIG. 2 is sized to closely approximate the shape of the pin 128, this need not be the case. Moreover, the plate 132 need not define the entire recess 144 as shown, but may be combined with other structures to define the recess 144.

The movement of the pin 128 upwardly into the support strut 76 may be achieved through the use of the fold mechanism 62, as alluded to above. The fold mechanism 62 is mounted within the handle 36. Alternatively, the fold mechanism 62 may be attached, for example, to the exterior of the handle 36. As a further alternative, the fold mechanism 62 may be fully mounted inside the handle 36, such that very little of the fold mechanism 62 is visible to the user.

The fold mechanism 62 of the illustrate example includes a control lever 148 (see FIG. 1) and cables (not shown) disposed in the legs 58 of the handle 36 and extending into the strut 76. The cables are attached to a respective one of the pins 128 (e.g., a pin and latch plate as located on each side of the stroller). When a suitable force is applied to the control lever 148 in the direction indicated by arrow 152, the cables move upwardly within the handle 36 and the strut 76. This upward motion of the cables causes the pins to be withdrawn into the ends of the struts 76 against the biasing force of the springs (not shown). When the force is removed, the pins 128, acting under the biasing force of the spring, return to their extended states and, thus, reengage the plates 132.

While the control lever 148 may be disposed, as shown, centrally relative to the bight 56, the control lever may alternatively be disposed offset along the bight 56. Alternatively, two control members 154 may be provided and may be mounted for movement along the legs 58 or struts 76. In such example, each control member 154 is attached to a separate one of the cables and, thus, two hands are required to release the frame for folding. Further, the alternative two handled arrangement may be used in combination with the fold mechanism 62 described above as a back-up. As a still further alternative, bars or other rigid linkages may be used in place of the cables.

Attached to the frame 22 are the seats 28, 30. While the seats 28, 30 are shown one in front of the other in the figures, other arrangements may be used, such as a with the first seat 28 beside or next to the second seat 30. Alternatively, only one seat may be employed. In addition height adjustable headrests such as those described herein may be coupled to the seats 28, 30.

Referring to FIG. 1 and focusing on the first, or front, seat 28, the front seat 28 includes a seat base 160 and a seat back 162. Both the seat base 160 and the seat back 162 are defined in part by structural elements of the frame 22 or attached to the frame 22 and cloth or fabric attached to these structural elements (sometimes referred to as soft goods). The seat back 162 is moveable relative to the seat base 160. In particular, the seat back 162 pivots between a first (or upright) position as shown and a second (or reclined) position that is not shown.

Referring now to FIGS. 1 and 2, the seat base 160 is defined by a cloth support having a rigid panel disposed therein and attached between the lower side members 50. A cross bar is fixedly attached at ends between the lower side members 50 beneath the cloth support and rigid panel to add further support.

The seat back 162 is defined in part by a U-shaped frame 164 (shown in FIG. 2) pivotally connected to each of the lower side members 50. The frame 164 is covered with a cloth or fabric support, which may also enclose a rigid panel. The cloth support may be joined to or formed integrally with the cloth support that defines the seat base 160. A seat belt is attached to the first seat 28 for use in securing a child in the first seat 28 as a safety measure.

Referring again to FIG. 1, the second seat 30 also includes a seat base 166 (not visible in FIG. 1, but shown in FIG. 2) and a seat back 168. Here as well, both the seat base 166 and the seat back 168 are defined in part by structural elements of the frame 22 or attached to the frame 22 and cloth or fabric attached to these structural elements. The seat back 168 is moveable relative to the seat base 166. In particular, the seat back 168 may move between a first (or upright) position as shown in FIG. 1 and a second (or reclined) position that is shown in FIG. 2.

The seat base 166 includes a seat base support member 170, which is pivotably attached to the frame 22. For example with reference to FIG. 2, an end 176 of the seat base support member 170 is pivotably attached to an intermediate link 180, which is in turn pivotably attached to the lower side member 50. An end 184 of the seat base support member 170 is pivotably attached to another intermediate link 188, which is in turn pivotably attached to the support strut 76. A cloth support is attached at its ends to the seat base support members 170, and encloses a rigid panel. A crossbar is fixedly attached to the seat base support members 170 beneath the cloth support and rigid panel to add further support.

The seat back 168 is defined in part by a U-shaped frame 192 that is pivotally connected to each of the seat base support members (e.g., 170), for example, at ends 194. The frame 192 is covered with a cloth or fabric support, which may also enclose a rigid panel. A seat belt may also be attached to the second seat 30 for use in securing a child in the seat 30 as a safety measure. The adjustable canopies described herein are coupled to the seat backs 164, 168 as described below.

A recline mechanism 196 is provided for the second seat 30. The recline mechanism 196 positions the seat back 168 in a reclined position and/or an upright position relative to the seat base 166. The recline mechanism 196 may be replaced with a recline mechanism using flexible connectors, such as an adjustable strap, rather than the rigid linkages.

Figure 3:
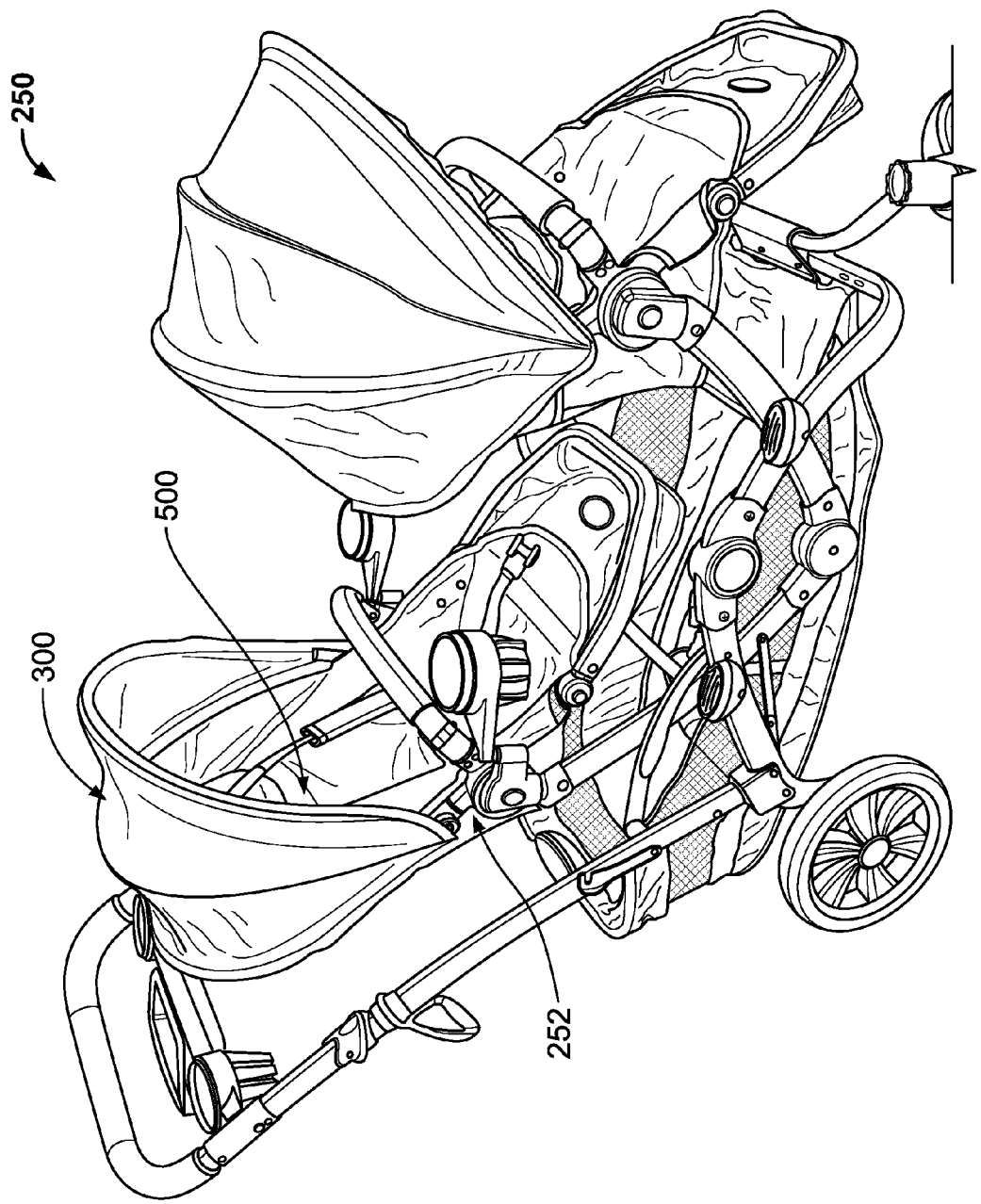
FIG. 3 is a perspective view of another child caretaking structure incorporating an example height adjustable canopy and an example height adjustable headrest.
Figure 4:
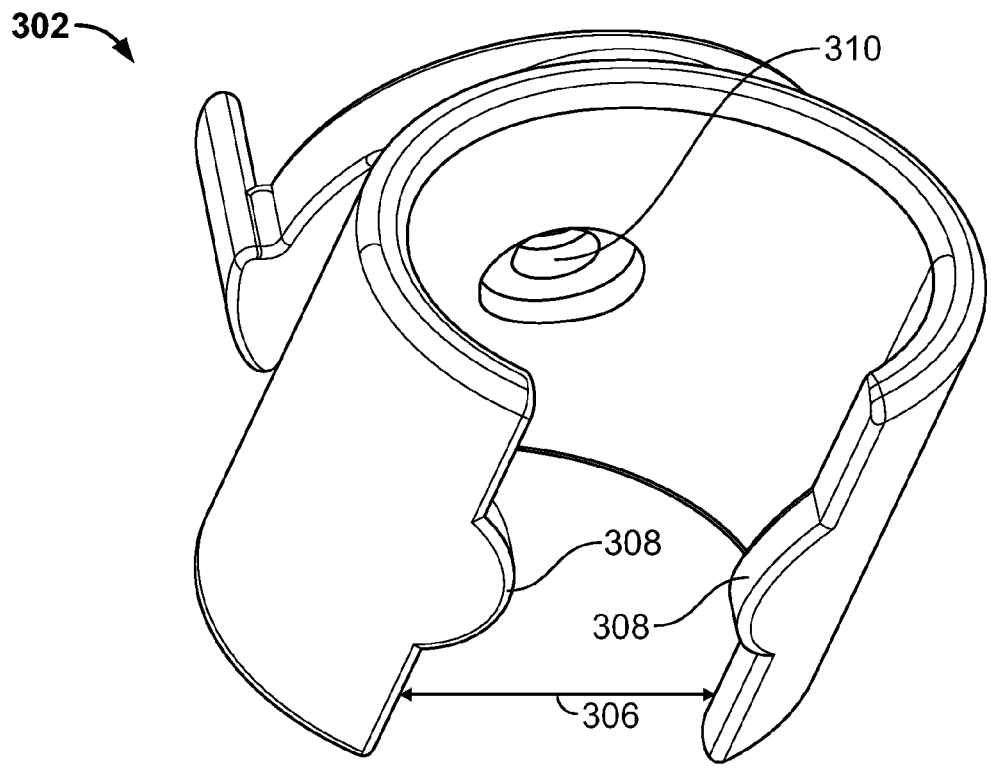
FIG. 4 is a perspective view of an inner surface of an example canopy clip.

Another example child caretaking structure is shown in FIG. 3. The child caretaking structure of FIG. 3 is another example stroller 250 that includes example height adjustable canopies 300 and example height adjustable headrests 500, which are described in more detail below.

Though the example child caretaking structure shown in FIGS. 1-3 are tandem strollers, the height adjustable canopies and headrests described herein may be used with any type of stroller including, for example, the strollers described in U.S. Pat. Nos. 6,932,377; 6,843,498; 5,947,555; 5,772,279; or 5,388,853, all of which are hereby incorporated herein by reference in their entireties. Furthermore, the height adjustable canopies and headrests described herein may be used with any type of child caretaking structure including, for example, high chairs, bouncers, walkers, bassinets, cribs, car seats, swings, etc.

FIGS. 4-22 show an example adjustable canopy 300 and an example height adjustable headrest 500 that may be used with child caretaking structures such as, for example, the example stroller 250 of FIG. 3, or any other type of stroller or child care product. The canopy 300 and the headrest 500 are independently height adjustable. The example canopy 300 and headrest 500 may be raised, for example, for a taller and/or older child, and/or lowered for example, for a shorter and/or younger child. The canopy 300 and headrest 500 may be used together on the same product or independently.

Turning first to the example canopy 300, FIGS. 4-9 show an example collar or canopy clip 302. The example canopy clip 302 is a flexible clip that may be made, for example, of a plastic or any other suitable material. The example canopy clip 302 has a semicircular or elliptical shape to slide relative to a frame of a stroller such as a seat frame 252 of the stroller 250. In other examples, the canopy clip 302 may have a different profile that compliments a differently-shaped stroller frame. The canopy clip 302 is slidably couplable to a track 304 (FIGS. 10 and 11) as shown in FIGS. 12-18.

Figure 5:
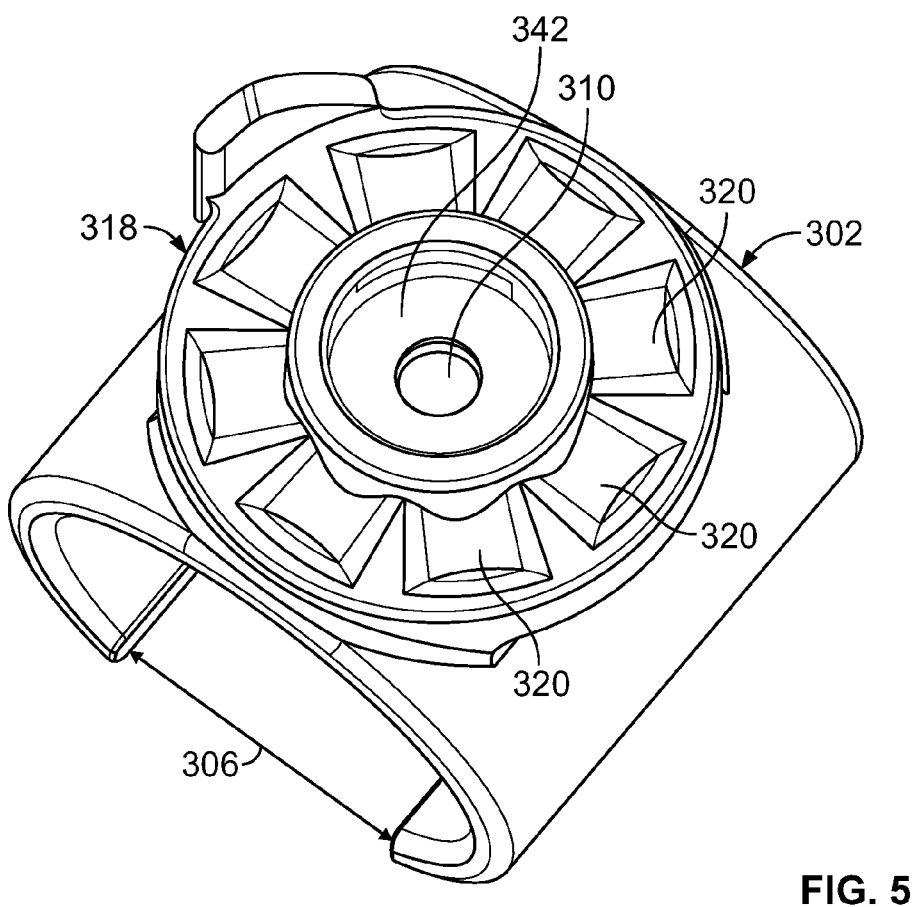
FIG. 5 is a perspective view of an outer surface of the example canopy clip of FIG. 4.
Figure 10:
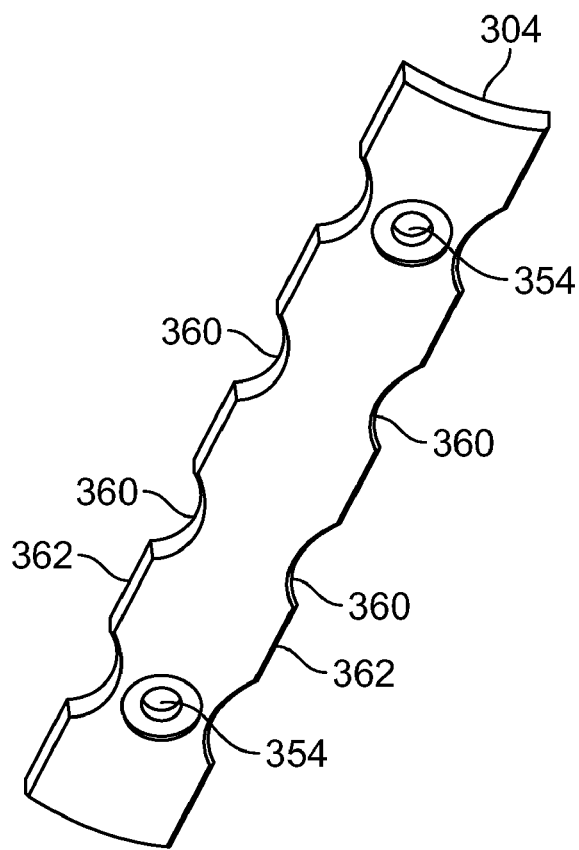
FIG. 10 is a perspective view of an outer surface of an example canopy track.
Figure 11:
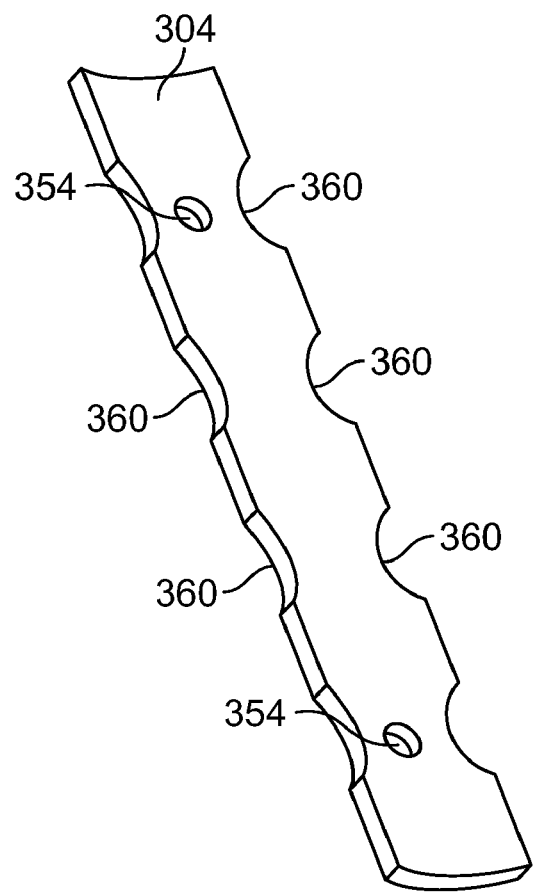
FIG. 11 is a perspective view an inner surface of the example canopy track of FIG. 10.
Figure 12:
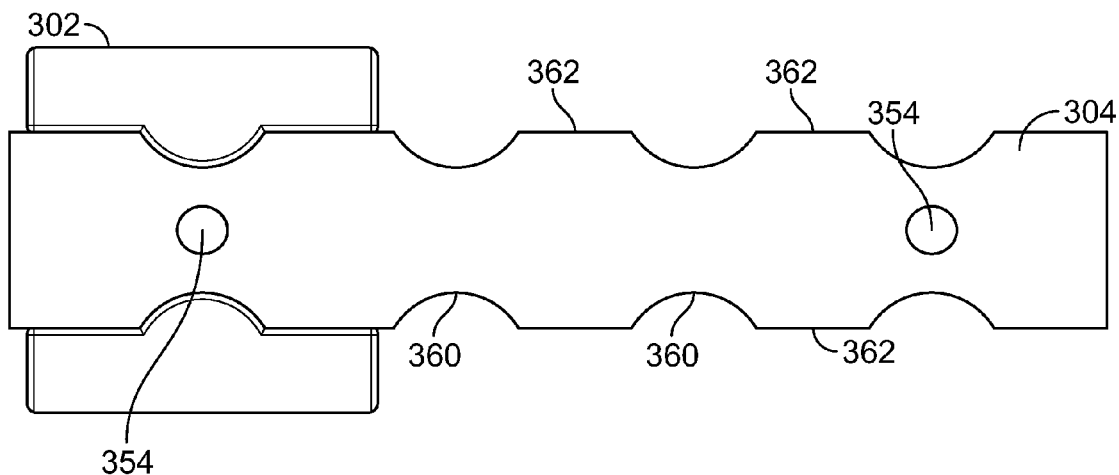
FIG. 12 is a plan view of the example clip of FIG. 4 located in its use position relative to the example track of FIG. 10 and showing the outer surface of the example track of FIG. 10.

The example canopy clip 302 has an opening 306 into which two protrusions 308 extend in opposed orientation. The opening 306 gives the ends of the canopy clip 302 a C-shaped cross-section (FIG. 5). In the illustrated example, the two protrusions 308 are spaced on opposite sides of the opening 306 in the canopy clip 302, and the example protrusions 308 are integrally formed with the clip 302. However, in other examples, there may be any number of protrusions (e.g., 1, 3, 4, etc.) of any shape, arrangement or spacing. Furthermore, in other examples, the protrusions may be separable components that are coupled to the canopy clip 302.

Figure 15:
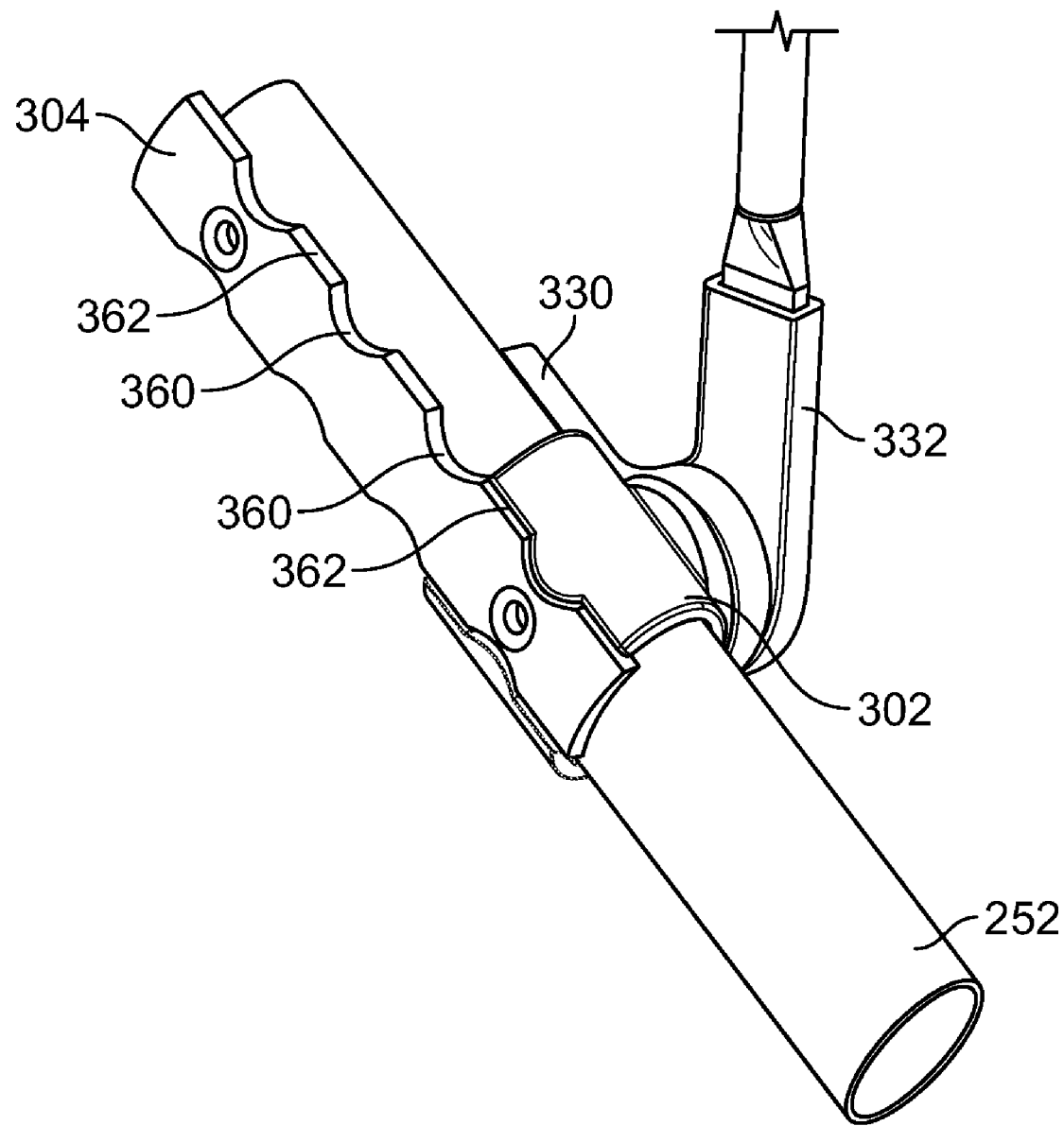

The inner surface of the example canopy clip 302 includes at least one aperture 310 through which a fastener (e.g., a screw or rivet) traverses to couple the canopy clip 302 to a respective canopy connection component, i.e., canopy stay connector 330, 332 (FIGS. 14a, 14b and 15). Any suitable mechanical or chemical fastener may be used to couple the canopy clip 302 with its respective canopy stay connector 330, 332.

The outer surface of the example canopy clip 302 includes a circular seat 318 (see FIGS. 2 and 6), which includes a plurality of detents 320 that are arranged, in the illustrated example, in equally spaced orientation around the perimeter of the seat 318, though any other arrangement may be used as well. In the illustrated example, the detents 320 have rounded contours but may, alternatively, have linear slopes of any gradient. The detents 320 of the canopy clip 302 engage corresponding extensions on a respective one of the canopy stay connector 330, 332. In the illustrated example, there is a first canopy stay connector 330 and a second canopy stay connector 332. The illustrated example shows two extensions 336, 338 on the first canopy stay connector 330 for frictionally coupling the canopy stay connector 330 to the canopy clip 302. The extensions 336, 338 are located on opposite sides of the first canopy stay connector 330 and, thus, simultaneously sit in detents 320 on opposite sides of the circular seat 318. The first canopy stay connector 330 abuts the seat 318 with some play such that applying sufficient rotational force to the canopy stay connector 330 causes the extensions 336, 338 to ride up the walls of their respective detents 320 and re-seat into their adjacent detents 320. As a result, the detents 320 and extensions 336, 338 cooperate to define multiple positions of the canopy 300 and to hold the canopy 300 in one of such positions in the absence of an applied external force to change the same.

The first canopy stay connector 330 also includes a central wall 340 (see FIG. 15) that engages with a corresponding central recess 342 on the canopy clip 302 (see FIG. 5). The central wall 340 rotates within the central recess 342 when the canopy 300 is rotated between an extended or open position and a retracted or closed position. The interaction between the wall 340 and the recess 342 together with the fastener joining the clip 302 to the canopy stay connector 330, 332 maintains alignment of the assembly. The first canopy stay connector 330 is also coupled to and adjustable with respect to the second canopy stay connector 332 in a manner similar to that described above with respect to the first canopy stay connector 330 coupled to the clip 102. In particular, the side of the canopy stay connector 330 facing the second canopy stay connector 332 (FIG. 14b) defines two extensions 336, 338, which are similar to the extensions 336, 338 of FIG. 14a. The side of the second canopy stay connector 332 facing the first canopy stay connector 330 includes a circular seat 348 defining a plurality of recesses or detents 350. As with the detents 320 and extensions 336, 338 (FIG. 14a), the detents 350 of the second canopy stay connector 332 and the extensions 336, 338 (FIG. 14b) of the first canopy stay connector 330 cooperate to define a plurality of fixed rotational positions, in this instance, between the first and second canopy stay connectors 330, 332. Sufficient force applied to the first canopy stay connector 330 and/or the second canopy stay connector 332 causes relative rotation between the canopy stay connectors 330, 332 and movement of the extensions 336, 338 (FIG. 14b) to difference recesses 350.

Each of the canopy stay connectors 330, 332 includes an extended recess dimensioned to receive an end of a canopy support or stay 352. Therefore, movement of either or both of the canopy stay connectors 330, 332 changes the positions(s) of the canopy stay(s) 352 and, thus, changes the position and/or rotation of the canopy 300. In this example, the first canopy stay connector 330 includes extensions 336 and 338 on both sides, and the canopy clip 302 and second canopy stay connector 332 include detents 320 and 350, respectively. However, in other examples, the extensions and detents may be reversed or the canopy clip 302, first canopy stay connector 330 and/or second canopy stay connector 332 may include a combination of extensions and/or detents.

In addition, in the illustrated example, two canopy stay connectors 330, 332 are shown, which are used to selectively retract or extend the canopy 300, depending on the rotational position of the canopy stay connectors 330, 332 with respect to each other and with respect to the canopy clip 302. In other examples, more canopy stay connectors may be used as well to enable further variants of extension of the canopy 300 between fully extended and fully retracted including, for example, mostly extended, mostly retracted, etc. Alternatively, in some examples, there may be only a single canopy stay connector coupled to the canopy clip 302, which also enables the canopy 300 to be fully retracted, fully extended or anywhere therebetween depending on the rotational position of the canopy stay connector and the canopy clip 302 with respect to each other. More canopy stay connectors and/or more rotational positions may be included to increase the range of motion of the canopy 300. The range of motion of the canopy 300 enables a user to adjust the position of the canopy 300 to optimize viewing or shading of a child in different seat configurations including, for example, a first seat configuration in which the child faces in the same direction as the user and a second seat configuration in which the position of the seat is reversed and the child faces the user.

Figure 13:
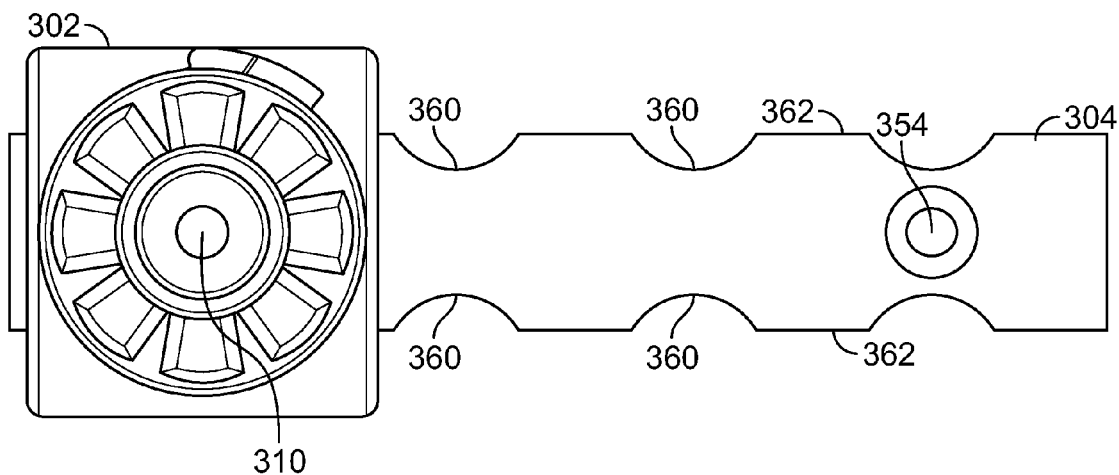
FIG. 13 is a plan view similar to FIG. 12 but showing the inner surface of the example track of FIG. 10.
Figure 14:
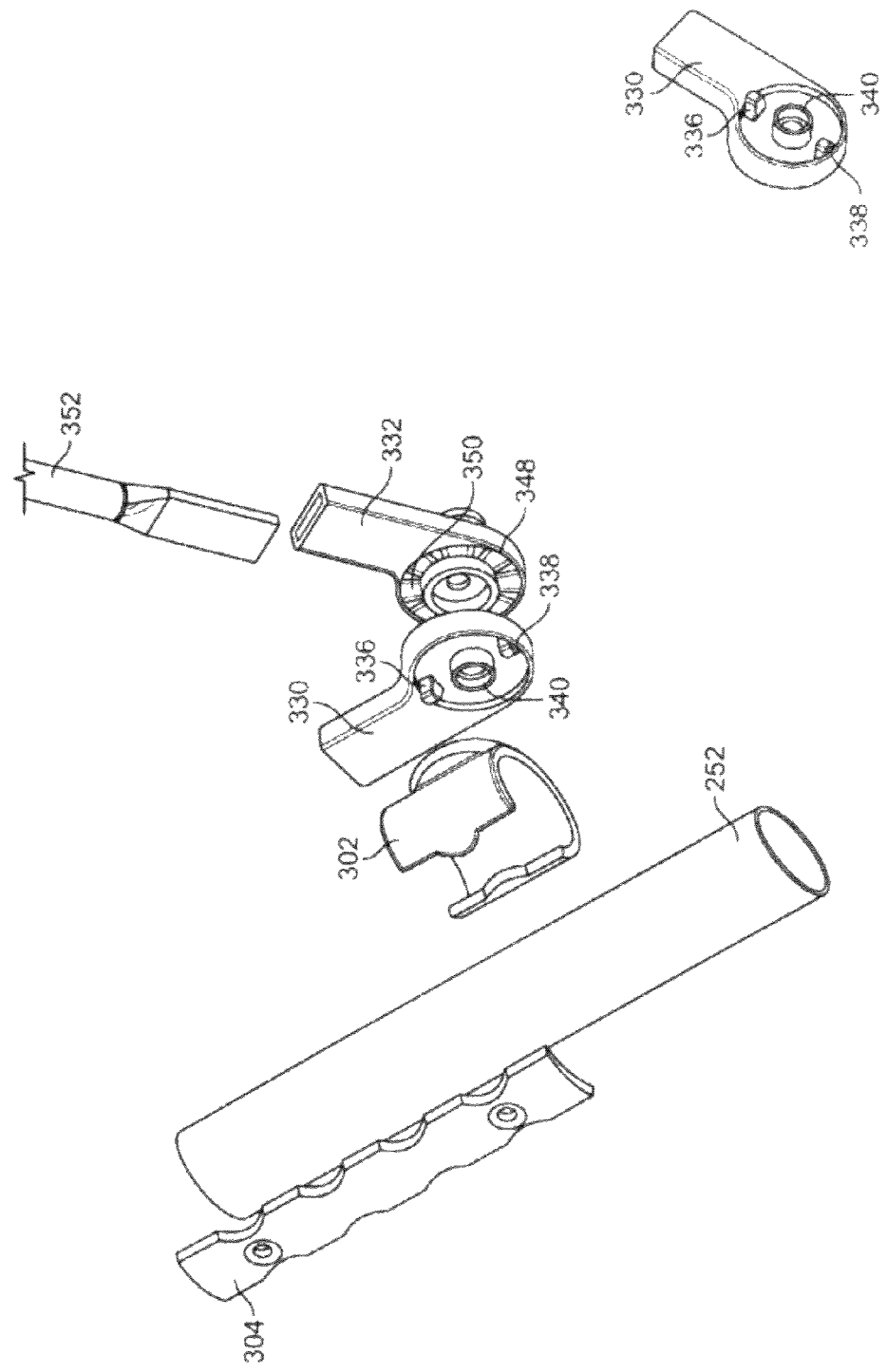
FIG. 14a is an exploded view of a combination of the example clip of FIG. 4, the example track of FIG. 10, a portion of an example stroller frame, two canopy connection components and a canopy support.
FIG. 14b is a side view of the example canopy support of FIG. 14a, showing the opposite side of one of the example canopy connection components.
Figure 16:
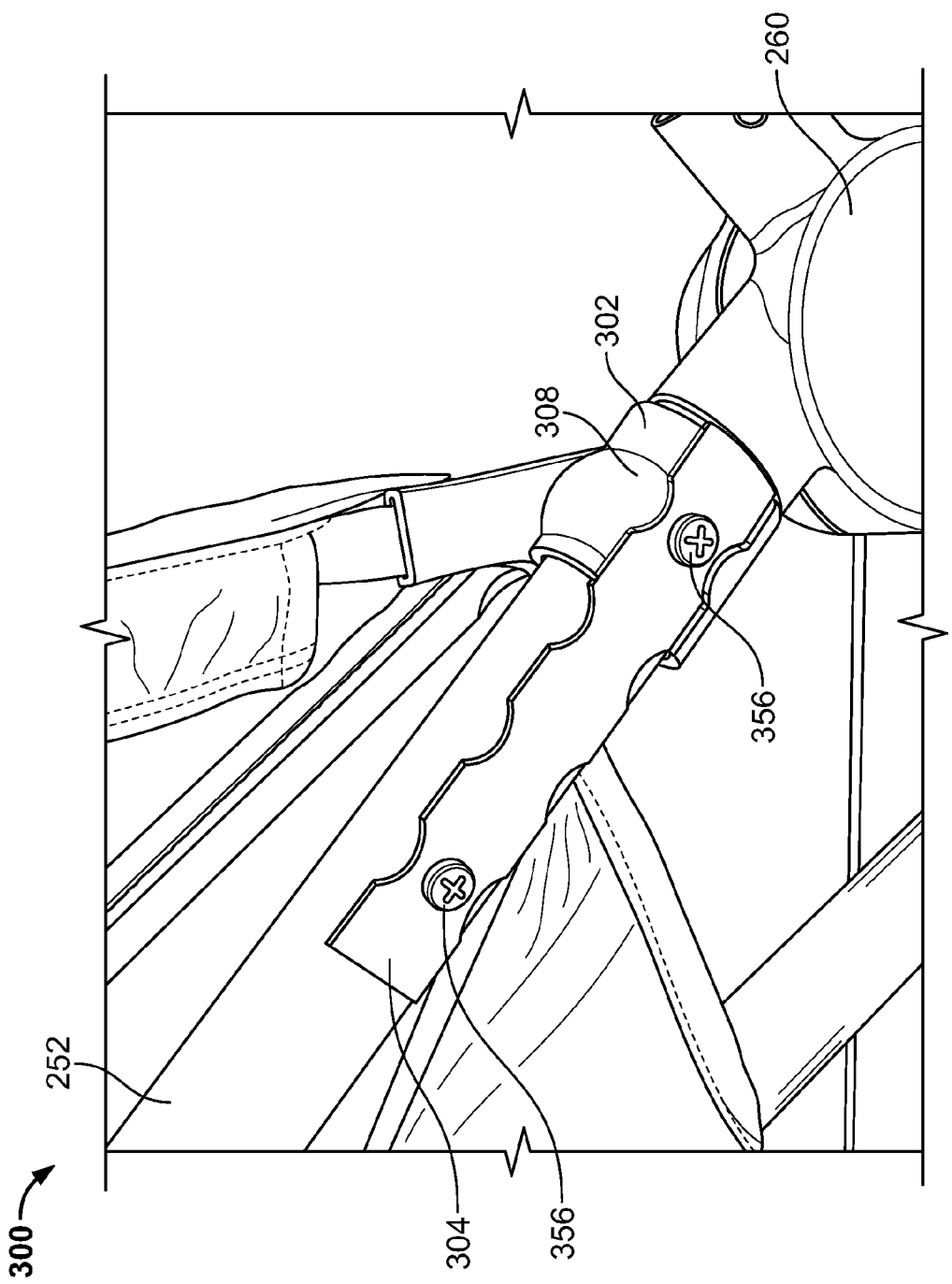
FIG. 16 is an assembled view similar to FIG. 15 but showing the example clip and track combination with an attached canopy and an example stroller frame joint within the stroller.
Figure 17:
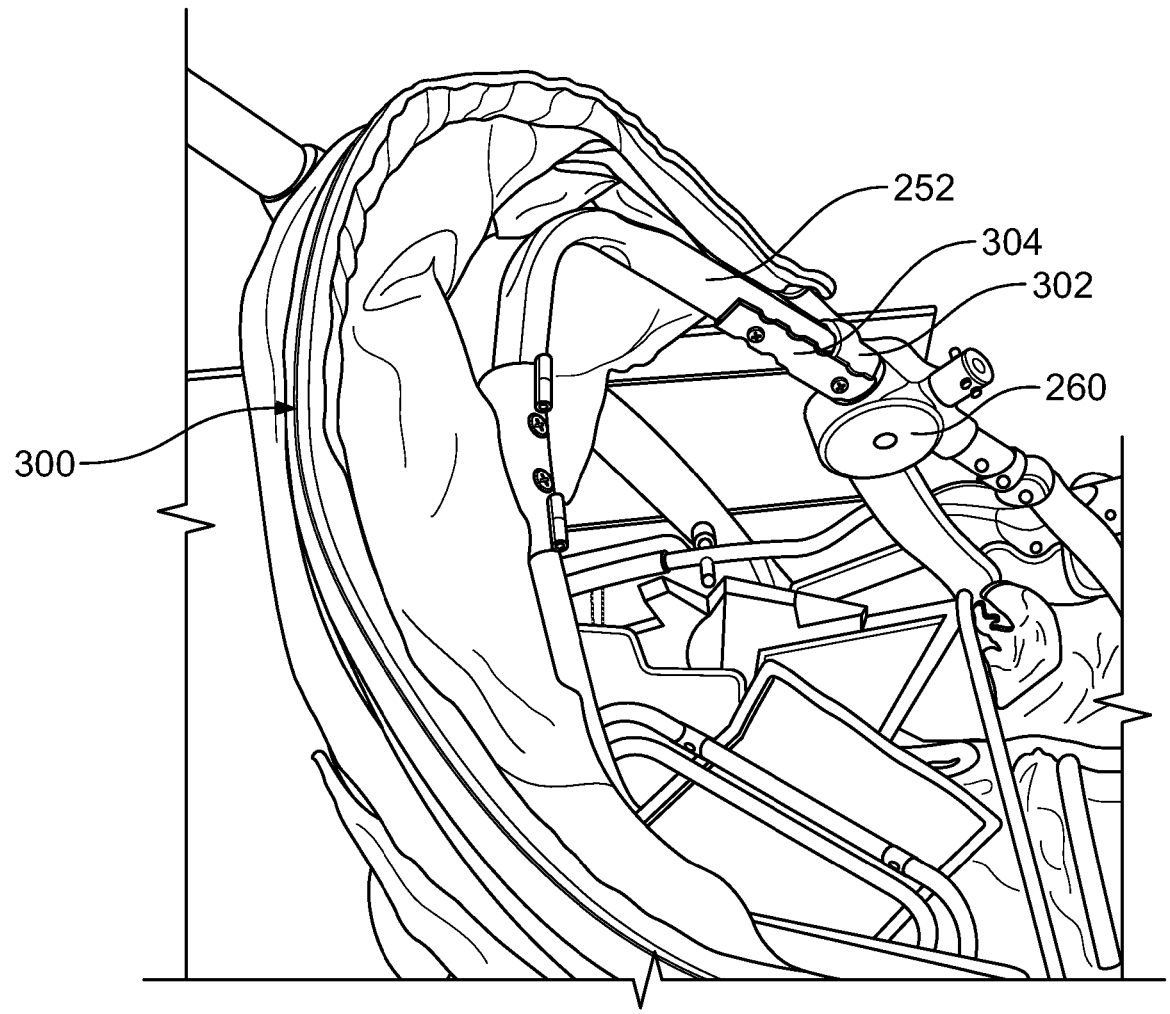
FIG. 17 is a perspective of the example combination of FIG. 16 illustrating a method of adjusting the height of the canopy.
Figure 18:
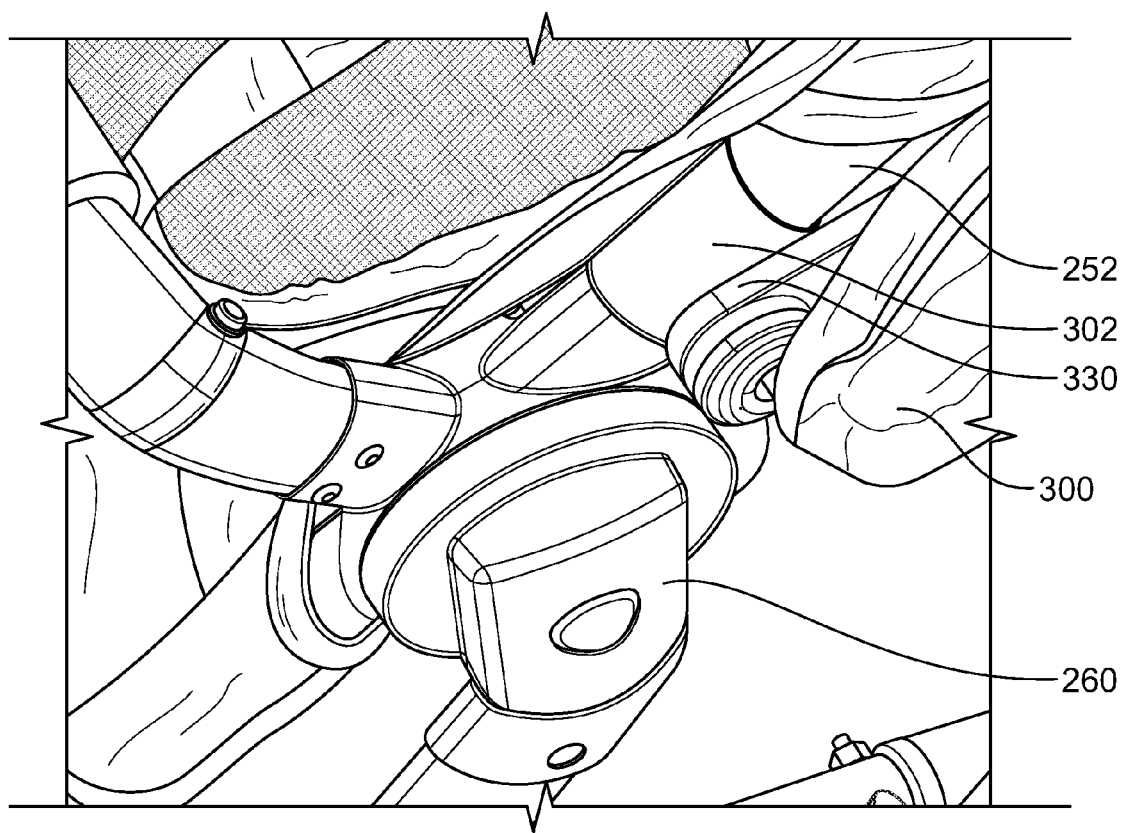
FIG. 18 is a perspective view showing the example combination of FIG. 16 from outside the stroller.

As shown in FIGS. 10-18, each of the tracks 304 has an inner surface that is contoured to compliment an outer surface of a stroller frame 252. In the illustrated example, the tracks 304 define two apertures 354 through which a corresponding fastener 356 (e.g., a screw or a rivet such as shown in FIG. 16) extends to fasten the track 304 to the stroller frame 252. Although two apertures 354 and two fasteners 356 are shown in FIG. 13, any number of apertures and/or fasteners may be used (e.g., 1, 3, 4, etc.). Furthermore, in other examples, the tracks 304 may be coupled to the stroller frame 252 via any other type of mechanical or chemical fastener, or may be integrally formed with the frame. Furthermore, in some examples, the track 104 may be coupled to or integrally formed with a stroller frame joint 260 (see FIGS. 16-18).

The sides of the tracks 304 define a series of indentations or valleys 360. The valleys 360 run in lines parallel to the longitudinal axis of the respective track 304. The indentations 360 are separated by peaks or lands 362. The protrusions 308 of the canopy clip 302 engage with the valleys 360 of the track 304 to fix the canopy 300 at a certain height along the stroller frame 252. Though four indentations 360 and, thus, four heights are shown in the illustrated example, any number of valleys 360 may be included to select the number of heights to which the canopy 300 may be adjusted. Further, the clip 302 can be provided with the valleys and the tracks provided with mating protrusions, if desired.

To move the canopy 300 from a first height to a second height, the canopy clip 302 (and, thus, the first and second canopy stay connectors 330, 332) are pushed or pulled up or down with respect to the stroller frame 252 (e.g., along the longitudinal axis of the track 304). As the canopy clip 302 is moved, the canopy clip 302 flexes, and the protrusions 308 ride over or around the peaks 362 of the track 304 and into adjacent valleys 360. In alternative examples, the canopy 300 may include a tab or handle (e.g., handle H in FIG. 8) that may be grasped by a user to facilitate movement of the canopy clip 302, canopy stay connectors 330, 332, and canopy 300 along the track 304. The canopy 300 may be adjusted to the opened position, the closed position, or any position therebetween at any of the heights defined by the valleys 360 or even when the canopy clip 302 is between two height positions.

The example canopy clip 302, canopy stay connectors 330, 332, track 304 and other components are described and shown in connection with one side of the stroller 250. Similar components located on the opposite side of the stroller 250 are substantially identical to the described components.

FIGS. 19-22 show an example height adjustable headrest 500 that may be used in connection with a child caretaking structure including, for example, the child caretaking structures 20 and 250 of FIGS. 1-3. The example headrest 500 is slidably coupled to a seat back 502 without a latching mechanism. The seat back 502 includes a back panel 504 and a front panel 506 that together define a pocket 508. The headrest 500 is slidably received in the pocket 508. The front panel 506 may be made of any suitable material and is fastened to the back panel 504 through any suitable mechanical or chemical fasteners such as, for example, by sewing the front panel 506 to the back panel 504. Also, in the illustrated example, the front panel 506 includes an elastic band 512 at one end. The elastic band 512 helps retain the headrest 500 within the pocket 508.

Figure 19:
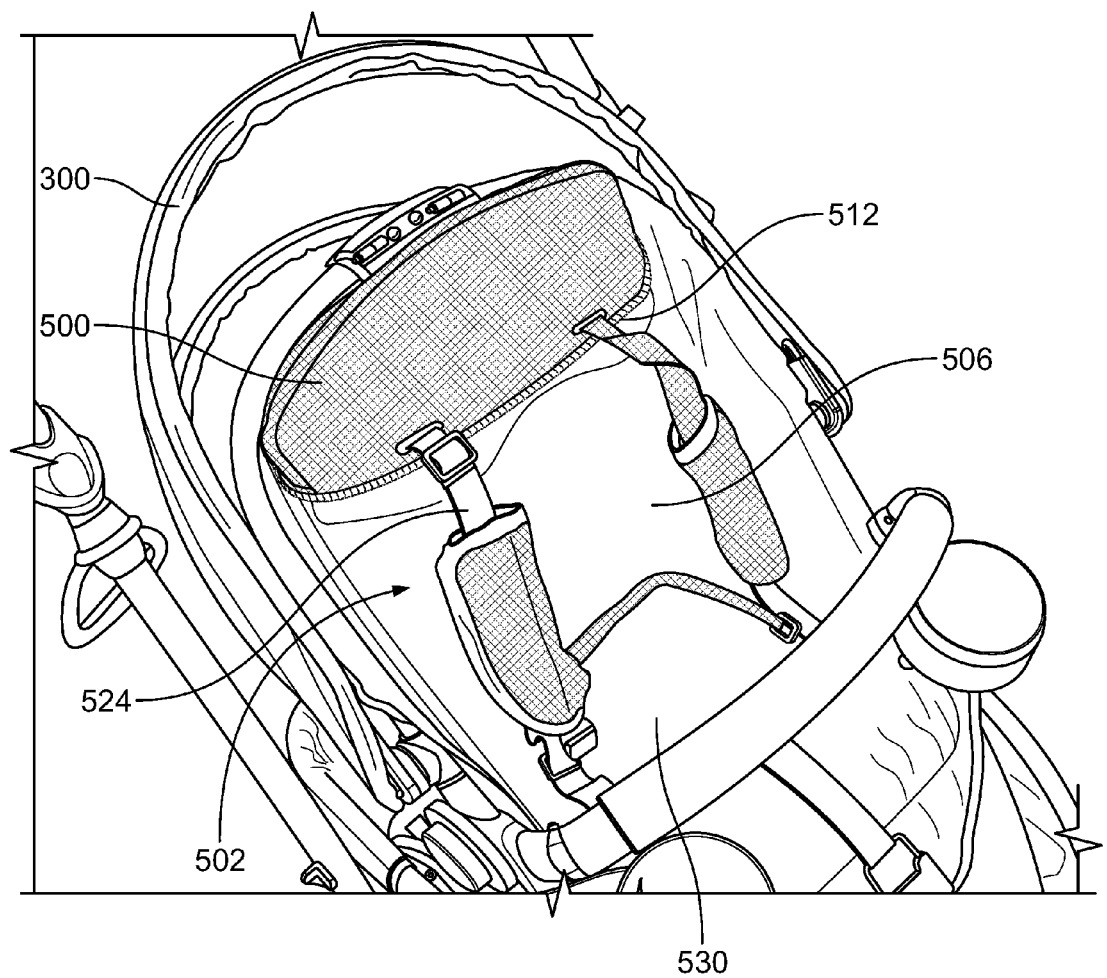
FIG. 19 is a perspective front view of the stroller and canopy of FIG. 17, showing an example seat back with a height adjustable headrest in a retracted position.
Figure 20:
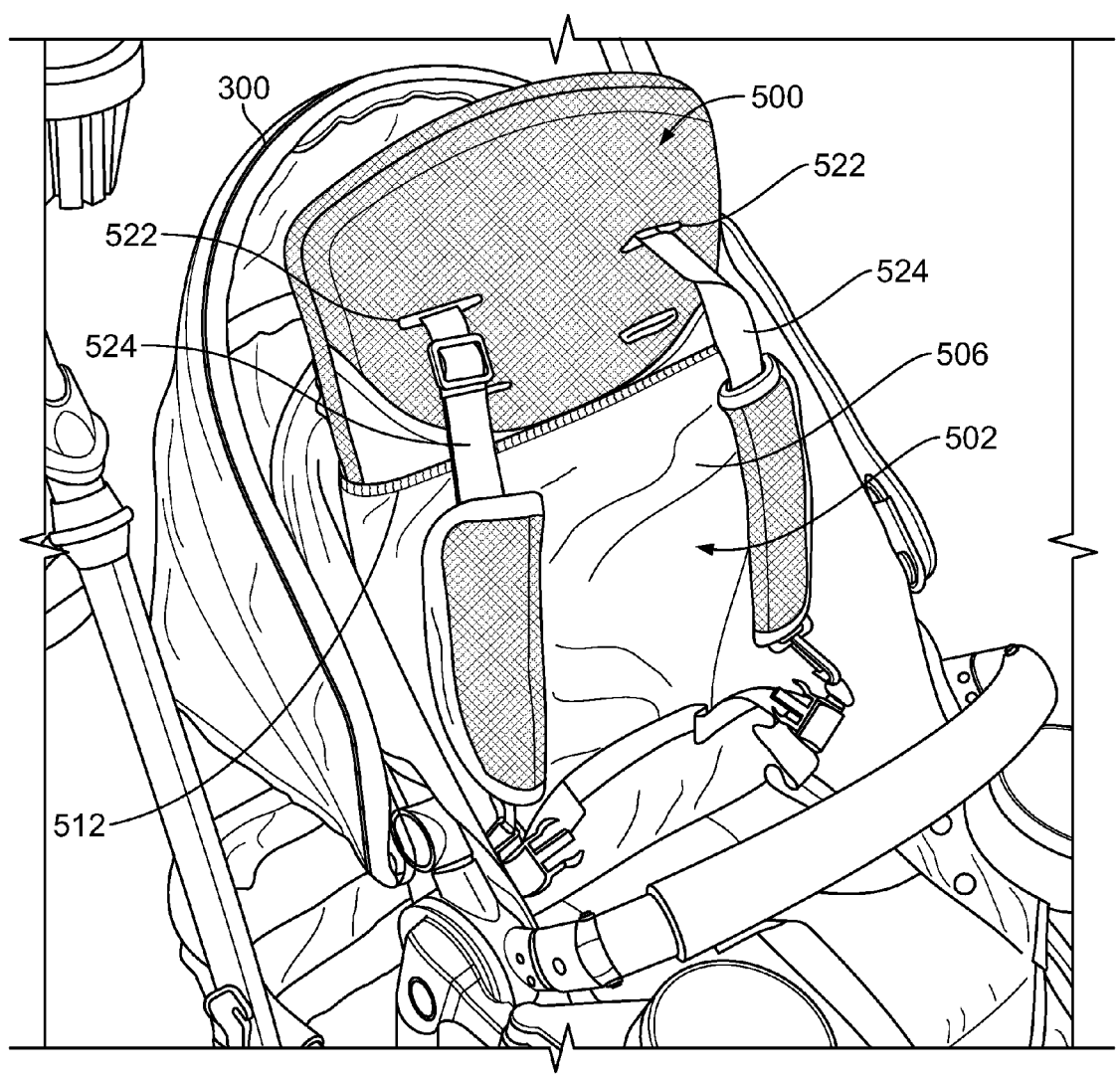
FIG. 20 is a view similar to FIG. 19 but showing the headrest in a raised/extended position.
Figure 21:
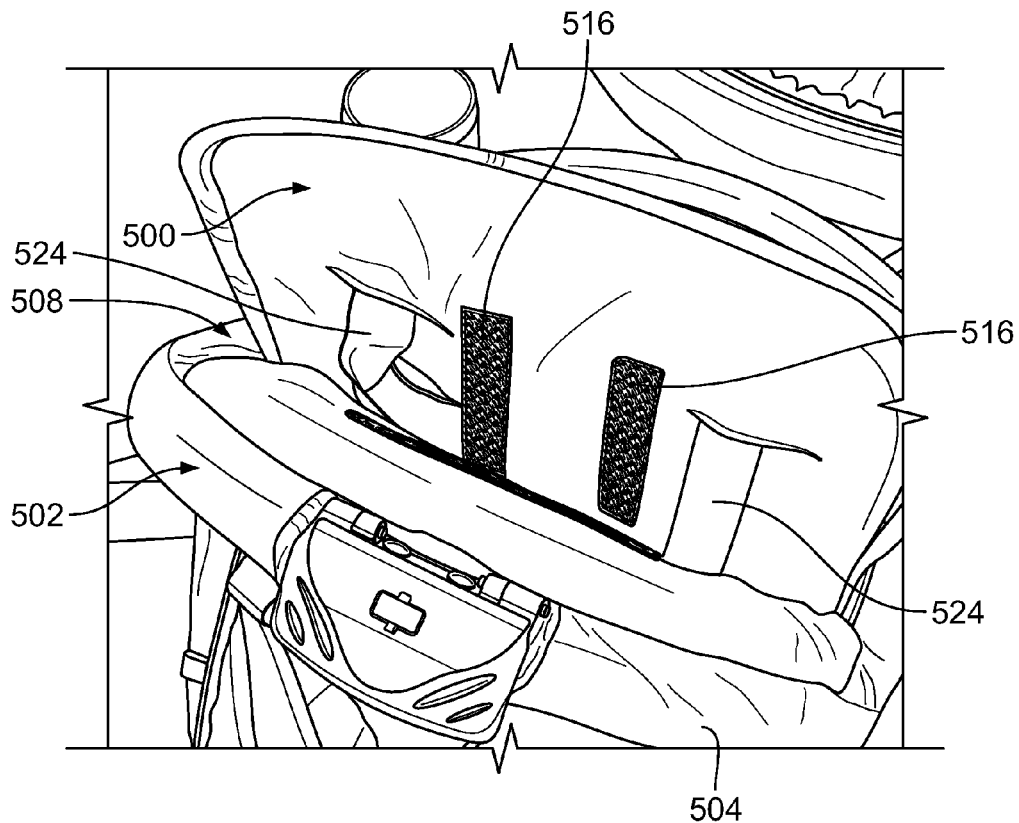
FIG. 21 is a rear perspective view of the example headrest of FIG. 20 showing the headrest in a raised/extended position.
Figure 22:
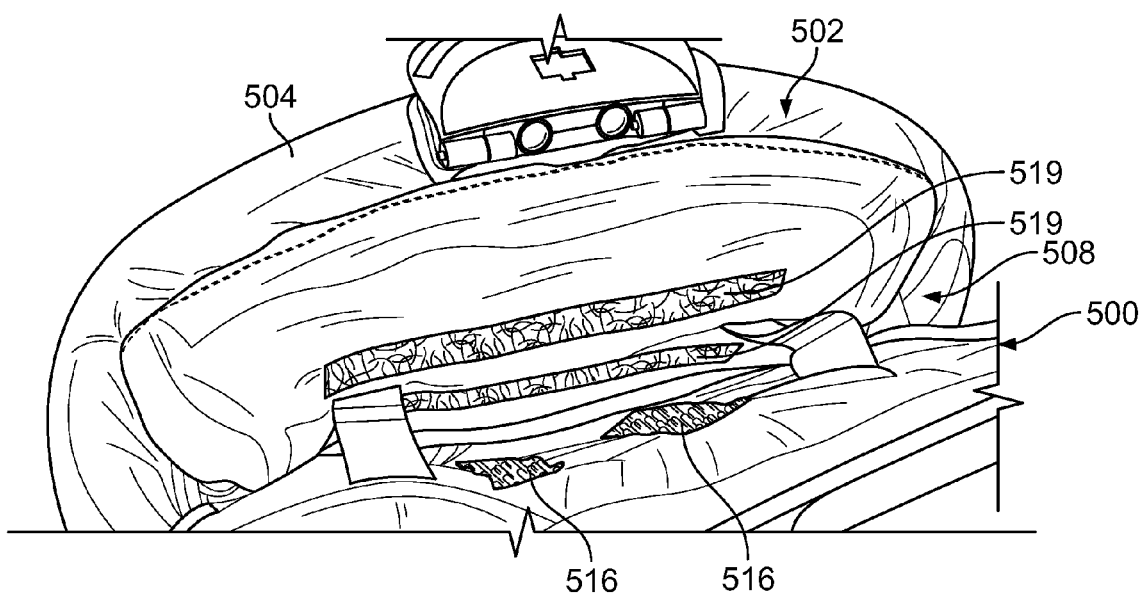
FIG. 22 is a front perspective view of an example seat back and the example headrest of FIG. 19 pulled forward.

In FIG. 19, the headrest 500 is in its lowest position. FIG. 20 shows the headrest 500 raised to a higher position. The rear side of the headrest 500 (FIG. 21) includes headrest fasteners 516 which may be, for example, Velcro strips. In this example, the headrest fasteners 516 are vertically oriented and are substantially aligned in parallel relationship to one another. In other examples, the headrest fasteners 516 may be arranged substantially horizontally, or in any other orientation, and each of the plurality of headrest fasteners 516 may be aligned differently than other ones of the headrest fasteners 516. The front side of the back panel 504 (i.e., the surface of the back panel 504 within the pocket 508) also includes one or more back panel fasteners 519 which also may be, for example, Velcro strips 519 (see FIG. 22). The back panel fasteners 519 on the back panel 504 are arranged substantially horizontally and parallel with respect to one another, but may be arranged, in alternative examples, substantially vertically, diagonally or in any other orientation including in the same orientation as the headrest fasteners 516, and each of the plurality of back panel fasteners 519 may be aligned differently than other ones of the back panel fasteners 519. The mating headrest and back panel fasteners 516, 519 of the illustrated example allow the headrest 500 to be coupled to the back panel 504 at an infinite number of incremental discrete heights between the uppermost position and the lowermost position. Thus, the headrest 500 is adjustable over a substantially continuous range of positions. The highest point of the range occurs when the lowest portion of the headrest fasteners 516 on the rear of the headrest 500 is coupled to the highest portion of the back panel fasteners 519 on the front of the back panel 504. The lowest point of the range occurs when the headrest 500 is fully inserted into the pocket 508. Furthermore, in some examples, the headrest 500 is also coupled to one of the back panel 506, the front panel 504 or a seat bottom 530 to prevent the headrest 500 from being fully removed from the pocket 508. In such examples, the headrest 500 may be coupled to the one of the back panel 506, the front panel 504 or the seat bottom 530 via any suitable fastener such as, for example, a tether (not shown), which may be made of plastic, fabric or any other suitable material.

To adjust the height of the headrest 500, the user applies a force in an upward direction, a forward direction, a downward direction or any combination thereof sufficient to overcome the frictional binding force of the headrest and back panel fasteners 516, 518. After this binding force has been overcome, the user may align the headrest 500 with the back panel 504 at any desired height within the range of possible positions. When the headrest 500 is positioned at the desired height, the user may apply a force to the front of the headrest 500 in the direction of the back panel 504 to engage the headrest and back panel fasteners 516, 519 and secure the headrest 500 at the corresponding height. The binding force of the headrest and back panel fasteners 516, 519 holds the headrest 500 at a specific height relative to the back panel 504 and, thus, relative to the frame of the stroller 252.

In the illustrated example, there are apertures 522 defined in the headrest 500 through which shoulder straps 524 may extend. Each shoulder strap 524 includes a buckle that may be used to lengthen or shorten the shoulder straps. The shoulder straps 524 may be lengthened for a taller or larger child or otherwise when the headrest 500 is in a relatively higher position. The shoulder straps 524 may be shortened for a shorter or smaller child or otherwise when the headrest 500 is in a relatively lower position. As a result, the shoulder straps 524 adjust to the size of the child as the headrest is positioned for that child.

The shoulder straps 524 are anchored behind the headrest 500 using, for example, D-rings that can pass through the openings 522 in a first orientation to assemble the seat belt(s) 524 to the headrest 500, but cannot pass through the headrest 500 in a second orientation when the seat belt(s) 524 are intended to be secured to the headrest 500.

Any example feature described herein may be combined with any other example feature described herein. For example, the height adjustable canopy may be used with the head adjustable headrest.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A child caretaking structure comprising:
a frame having a track with a plurality of indentations; and
a canopy including a first canopy stay connector rotatably coupled to a canopy clip and a second canopy stay connector rotatably coupled to the first canopy stay connector, the canopy clip being slidably coupled to the frame and including a first end and a second end, the canopy clip further comprising at least one protrusion between the first end and the second end dimensioned to selectively engage a first of the indentations of the track to fix the canopy at a first height, wherein the first canopy stay connector includes a plurality of first extensions and a plurality of second extensions, the canopy clip includes a plurality of first detents to selectively mate with the first extensions, and the second canopy stay connector includes a plurality of second detents to selectively mate with the second extensions, and rotation of the one or more of the first canopy stay connector or the second canopy stay connector retracts or extends the canopy.

2. A child caretaking structure as recited in claim 1, wherein
the canopy clip has a c-shaped cross-section and includes a first end and a second end at opposed ends of the c-shape, and wherein the protrusion is to engage a second of the indentations of the track to fix the canopy at a second height.

3. A child caretaking structure as defined in claim 1, wherein the first canopy stay connector includes a central wall and the canopy clip includes a central recess, the central wall to engage the central recess so that the first canopy stay connector and the canopy clip remain aligned during rotation.

4. A child caretaking structure as defined in claim 1, wherein the canopy clip has a c-shaped cross-section and includes a first end and a second end at opposed ends of the c-shape, and the canopy clip further comprising the protrusion on the first end to selectively engage a first of the indentations of the track to fix the canopy at a first height and a second protrusion on the second end opposite the first protrusion, the second protrusion to engage a second of the indentations of the track to fix the canopy at the first height.

5. A child caretaking structure as defined in claim 1, wherein the canopy clip further includes a handle to facilitate movement of the protrusion between the first of the indentations and a second of the indentations.

6. A child caretaking structure as defined in claim 1, further comprising: a seatback; and a headrest adjustably coupled to the seatback.

7. A child caretaking structure as defined in claim 6, wherein the seat back includes a front face on which a plurality of first fasteners are mounted and the headrest includes a back face on which a plurality of second fasteners are mounted, at least one of the plurality of first fasteners engages at least one of the plurality of second fasteners at a first position to fix the headrest at a first height relative to the seat back.

8. A child caretaking structure as defined in claim 7, wherein at least one of the plurality of first fasteners engages at least one of the plurality of second fasteners at a second position to fix the headrest at a second height relative to the seat back, the second height being different than the first height.

9. A child caretaking structure as defined in claim 7, wherein the plurality of first fasteners are arranged at a first orientation and the plurality of second fasteners are arranged at a second orientation different than the first orientation.

10. A child caretaking structure as defined in claim 9, wherein the first orientation is perpendicular to the second orientation.

11. A child caretaking structure as defined in claim 7, wherein the plurality of first fasteners and the plurality of second fasteners comprise loop and hook fasteners.

12. A child caretaking structure as defined in claim 7, wherein the plurality of first fasteners and the plurality of second fasteners are coupled via friction.

13. A child caretaking structure as defined in claim 7, wherein the plurality of first fasteners and the plurality of second fasteners are couplable in a substantially continuous range of discrete positions.

14. A child caretaking structure as defined in claim 6, wherein the headrest is tethered to the child caretaking structure.

15. A child caretaking structure as defined in claim 6 further comprising a plurality of shoulder straps, wherein the shoulder straps are coupled to the headrest, and wherein adjustment of the headrest adjusts the shoulder straps.

16. A child caretaking structure as defined in claim 6, wherein the headrest is slidable received in a pocket.

* * * * *